Jan. 26, 1937.  A. H. CHAPLEAU  2,068,944
ELECTRIC CIRCUIT SWITCH CONTROLLING DEVICE
Filed Dec. 29, 1934  2 Sheets-Sheet 1
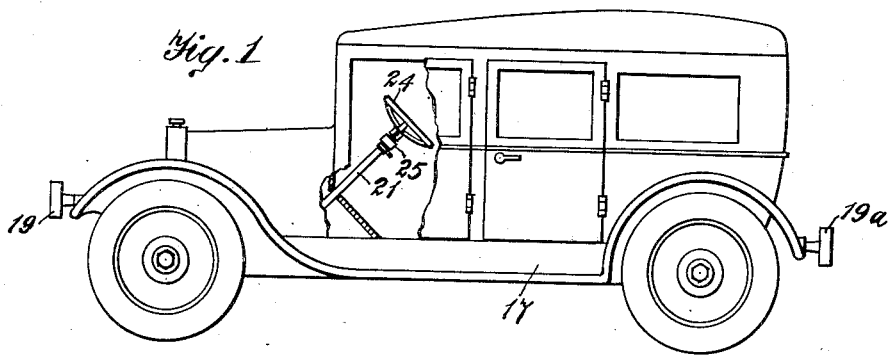
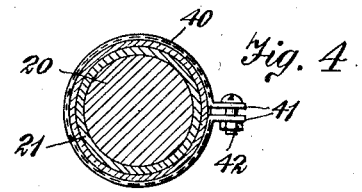
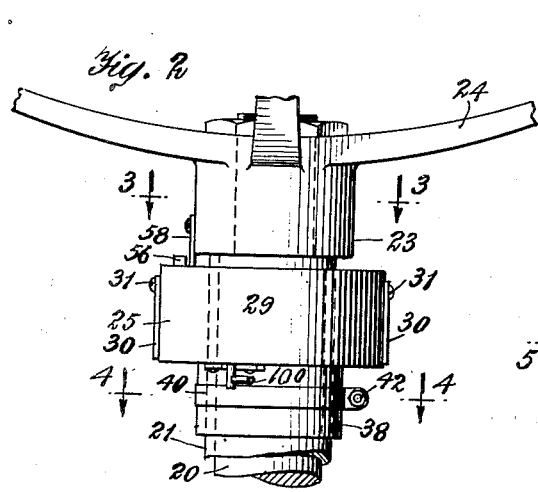
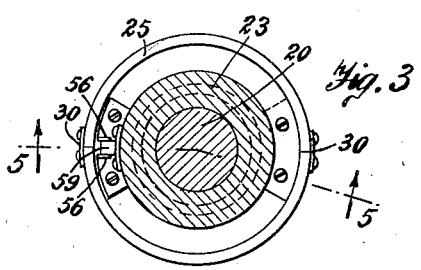
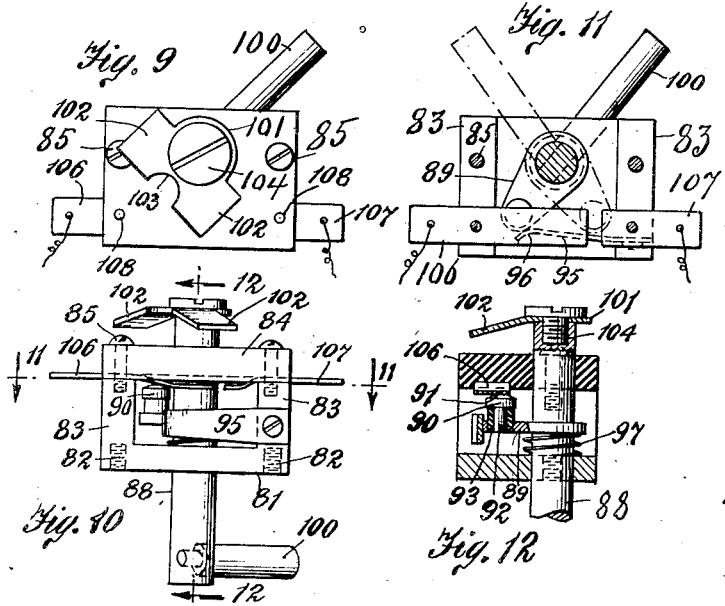
INVENTOR
ALEXANDER H. CHAPLEAU
BY
A A de Romeville
ATTORNEY

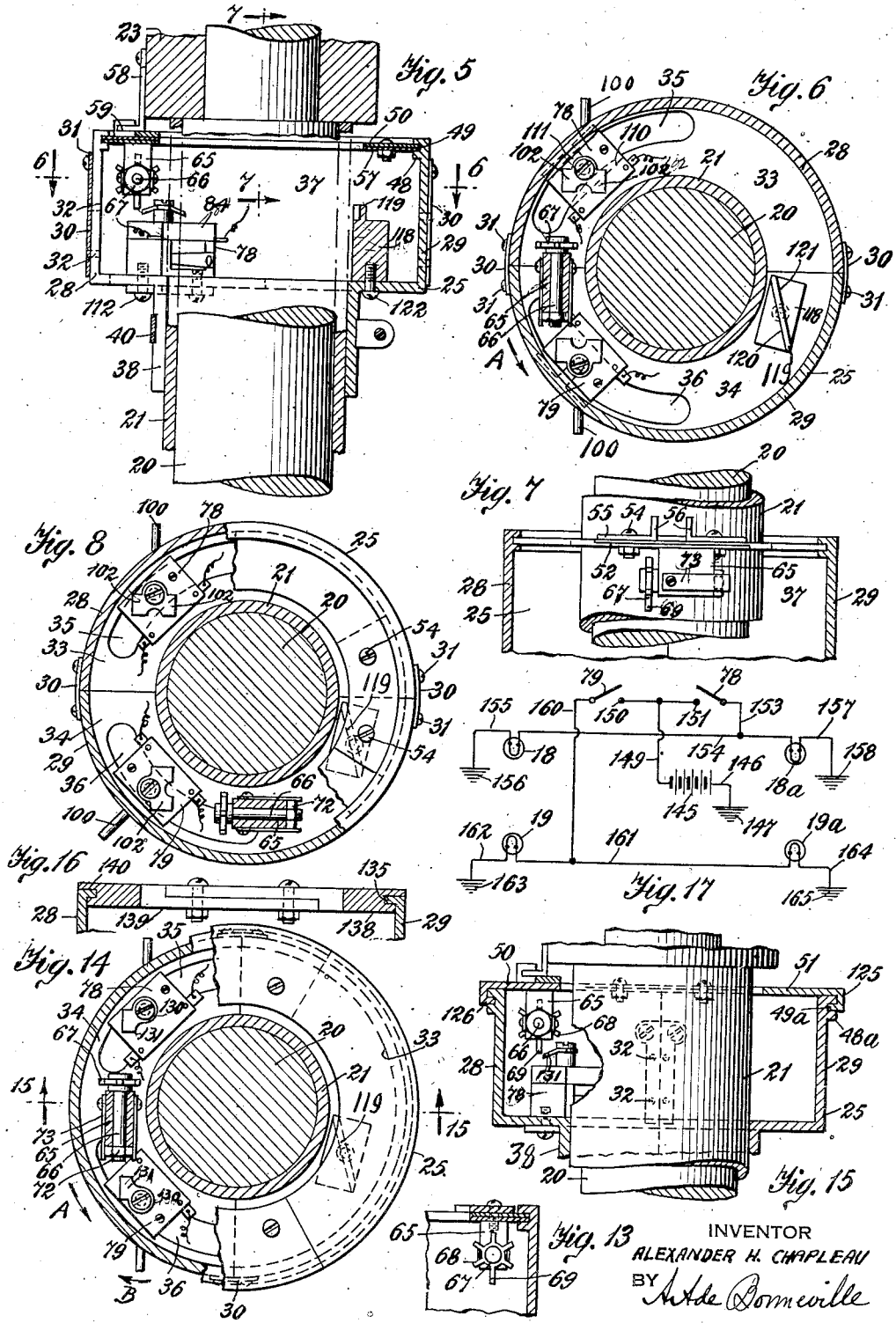

Patented Jan. 26, 1937

2,068,944

UNITED STATES PATENT OFFICE 2,068,944

ELECTRIC CIRCUIT SWITCH CONTROLLING DEVICE

Alexander H. Chapleau, Newark, N. J., assignor of forty per cent to Walter Chapleau, Bayonne, N. J.

Application December 29, 1934, Serial No. 759,648

5 Claims. (Cl. 200—59)

This invention relates to an electric circuit switch controlling device.

The object of the invention is the production of an electric circuit switch controlling device, for the signals of a motor vehicle and the like.

The second object of the invention is the production of an electric circuit switch controlling device for a motor vehicle, by means of which switches are opened or closed by turning the steering wheel of the vehicle in opposite directions.

In the accompanying drawings Fig. 1 indicates a side elevation of an automobile with the electric circuit switch controlling device connected thereto; Fig. 2 shows an enlarged elevation of the device; Fig. 3 is a section of Fig. 2 on the line 3.3; Fig. 4 shows a section on the line 4.4 of Fig. 2; Fig. 5 represents an enlarged section of Fig. 3 on the line 5.5; Fig. 6 shows a section on the line 6.6 of Fig. 5; Fig. 7 shows a partial left hand view of Fig. 5 and a section of said Fig. 5 on the line 7.7; Fig. 8 indicates a section similar to Fig. 6 with an additional element and the movable elements in different positions; Fig. 9 shows an enlarged top view of one of the switches of the device; Fig. 10 indicates a front view of Fig. 9; Fig. 11 shows a section of Fig. 10 on the line 11.11; Fig. 12 represents a section of Fig. 10 on the line 12.12; Fig. 13 shows a fragmentary portion of Fig. 5 viewed in an opposite direction; Fig. 14 shows a view similar to Fig. 6 with modifications; Fig. 15 indicates a section of Fig. 14 on the line 15.15; Fig. 16 shows a fragmentary modified portion of Fig. 7; and Fig. 17 indicates a wiring diagram of the device.

An automobile is indicated in its entirety by the numeral 17 having the front signal lights 18 and 19 and the rear signal lights 18a and 19a. The steering post is shown at 20 and which is positioned within the usual stationary steering post housing 21. To the upper end of the post 20 is fastened the hub 23 of the usual steering wheel 24.

A cylindrical shaped switch housing is designated in its entirety by the numeral 25 and comprises the members having the longitudinal semi-cylindrical shaped walls 28 and 29, which are detachably clamped to each other by the clamps 30. The said clamps 30 are fastened to the walls 28 and 29 by the screws 31, and small dowel pins 32 extend from each of the clamps 30 and engage openings in the walls 28 and 29. Bottom walls 33 and 34 respectively having the annular openings 35 and 36 extend from the walls 28 and 29 and which with the said walls 28 and 29 form the operating chamber 37. Semi-cylindrical shaped sleeve members 38 extend from the bottom walls 33 and 34. A clamping strap 40 engages recesses in the sleeve members 38 and has integral with its ends the flanges 41. The latter are connected to each other by the bolt 42. The sleeve members 38 are clamped to the steering post housing 21 by the strap 40.

Referring particularly to Figs. 1 to 13, the upper ends of the walls 28 and 29 have integral therewith the inwardly extending projections 48, that have the annular guide 49 formed therewith. An annular controlling plate comprises the members 50 and 51 which are halved at their ends as indicated at 52, to connect them to each other with the bolts 54. To the upper face of said annular controlling plate is fastened the female member 55 of a latch, having the upright prongs 56. The member 55 is fastened to the annular controlling plate by a pair of the bolts 54. From the hub 23 of the steering wheel 24 extends the male member 58 of the latch and which has integral therewith the latch heel 59, that engages the female member 55 and is positioned between its prongs 56.

To the lower face of the controlling plate having the members 50 and 51 is fastened the switch control housing 65. In the latter is journaled the shaft 66 and at one end of which latter is fastened the switch control wheel 67 having the five radially short projecting arms 68 of equal length and the one long radially projecting arm 69. The said arms are equally spaced from one another. A nut 72 is tightly clamped to the other end of the shaft 66. A pair of plate springs 73 have each one end fastened to a side of the housing 65, and their other ends are adapted to bear against the flat sides of the nut 72, to maintain the switch control wheel 67 in operative position.

A pair of similar electric controlling switches designated in their entireties by the numerals 78 and 79 are respectively positioned upon the upper faces of the walls 33 and 34. Each of said switches comprises the U shaped housing having the bottom wall 81 with the threaded openings 82 and the side walls 83. A cover 84 of electric insulating material is positioned upon the top faces of the walls 83 and is clamped thereto by the screws 85. A vertical operating shaft 88 extends through the wall 81 and the cover 84. An arm 89 extends from the shaft 88 and supports the terminal connecting cap comprising the head 90 having the spherical top wall 91. A shank 92 extends from said head which is enclosed in the sleeve 93 of electric insulating material, and the latter is tightly supported in an opening in the arm 89. A spring 95 has one end fastened to one of the side walls 83 and its free end 96 bears against the arm 89. A helical spring 97 encircles the shaft 88 and bears between the arm 89 and the wall 81. A manual operating handle 100 extends from the lower end of the operating shaft 88. Upon the top face of the shaft 88 is positioned the adjusting plate 101, comprising the pair of inclined wings 102 between which is indicated the cavity 103. The adjusting plate 101 is fastened to the operating shaft 88 by means of the screw 104. Terminals in the electric circuit of the controlling switches are indicated at 106 and 107 and extend into recesses in the cover 84, and are held in place by the pins 108. Against the bottom faces of the walls 33 and 34 bear the U shaped clamping plates 110, having each the central opening 111 through which the operating shaft 88 extends. Screws 112 extend through the walls 33, 34, the plates 110 and engage the threaded openings 82 of the walls 81, to detachably clamp the switches 78 and 79 in operating position.

Upon the top face of the wall 34 is detachably positioned the block support 118 for the plate shaped controlling cam 119 having the front face 120 and the rear face 121. A screw 122 extends through the wall 34 and engages the block support 118. The cam 119 inclines to a radial line extending through the steering post 20.

Referring to Figs. 14 and 15, the steering post is again shown at 20 with its steering post housing 21. The switch housing is again indicated in its entirety by the numeral 25, with its walls 28 and 29, and the clamps 30 to connect them to each other. The bottom walls for the housing are again indicated at 33 and 34. In this modification the openings 35 and 36 are indicated in the wall 34.

The walls 28 and 29 in this modification are indicated with the outwardly extending projections 43a, having the annular guides 49a. The members of the annular controlling plate are again indicated at 50 and 51, and have formed therewith the U shaped locking flanges 125 having the lower members 126. The latter engage the annular guides 49a and thereby provide a connection between the members 50 and 51 and the walls 28 and 29 which prevents dust entering the operating chamber 37.

The switch control housing 65 is again shown with its shaft 66, the switch control wheel 67 with its short projecting arms 68 and its long projecting arm 69. The controlling switches are again indicated at 78 and 79, but upon each of their operating shafts is secured the adjusting plate 130 having only one inclined wing 131.

Referring to Fig. 16 the invention is again modified in having integral with the walls 28 and 29 of its operating chamber the annular inwardly extending guide flanges 135. The members of the annular controlling plate are indicated at 138 and 139 which have formed therewith the annular guides 140 that engage the flanges 135 to prevent dust entering the operating chamber 37.

Referring to Fig. 17, the wiring diagram of the device is indicated with the pair of front signal lights 18 and 19 and the pair of rear signal lights 18a and 19a. The controlling switches are shown at 78 and 79. A battery 145 for electric current has extending from one of its terminals the wire 146 which is grounded at 147. From the other terminal of the battery extends the wire 149 which leads to the terminals 150 and 151 for the controlling switches 78 and 79. A wire 153 leads from the switch 78 and connects with the wire 154, which latter leads to the signal lights 18 and 18a. A wire 155 leads from the signal light 18 to the ground 156 and a wire 157 leads from the signal light 18a to the ground 158. A wire 160 leads from the switch 79 to the wire 161 and the latter leads to the signal lights 19 and 19a. A wire 162 leads from the signal light 19 to the ground 163 and a wire 164 leads from the signal light 19a and extends to the ground 165.

To energize the signal lights it may be supposed that the automobile is moving in a straight direction and the annular controlling plate having the members 50 and 51 is in its neutral position, as shown in Figs. 5, 6 and 7. If the operator wishes to turn to the left, as indicated by the arrow A in Fig. 6, the switch control wheel 67 being in position with its long arm 69 extending downwardly, the operator upon turning the steering wheel 24, the long arm 69 will engage the cavity 103 of the adjacent adjusting plate 101, and turns the latter to the position shown in Fig. 8 and the electric circuit of the switch 79 will be closed and the signal lights 19 and 19a on the left side of the automobile are lit. Upon further turning the steering wheel 24 the long arm 69 bears against the front face 120 of the cam 119 and thereby the wheel 67 turns through an angle of 60 degrees. The operator can make five turns of the steering wheel 24 and for each turn one of the short arms 68 contacts with the said front face 120 of the cam 119 without extinguishing the signal lights 19 and 19a. The wheel 67 turns 60 degrees for each time that one of its arms contacts with the cam 119. If the operator wishes to extinguish the signal lights 19 and 19a, he turns the steering wheel 24 in a direction opposite to the arrow A, and the short arms 68 one after the other will bear against the rear face 121 of the cam 119. After the last short arm 68 has left the said face 121, the long arm 69 is positioned downwardly and upon the turning of the wheel 24, the long arm 69 again contacts with the cavity 103 of the switch 79, which turns the latter from the position shown in Fig. 8 to the original position indicated in Fig. 6. Thereby the electric circuit for the signals 19 and 19a is opened, which extinguishes the said lights. To energize the signal lights 18 and 18a on the right side of the automobile, the steering wheel 24 is initially turned in a direction opposite to the arrow A and similar steps are taken as described. If desired the electric light signals can be controlled by the operating handle 100 for the steps already described.

Referring to Figs. 14 and 15, the signal lights are always energized by the operating handle 100, but are extinguished automatically.

In Figs. 14 and 15, the inclined wing 131 of the adjusting plate 130 is shown in its neutral position and the operating handle 100 is turned in the direction of the arrow B to energize the signals 19 and 19a. If the steering wheel is next turned in the direction of the arrow A, Fig. 14, the switch control wheel 67 will be turned as already described but the lights will remain energized. If the operator turns the steering wheel 24 in a direction opposite the arrow A, the switch control wheel 67 will be turned as before described until the long arm 69 is pointed downwardly when it will strike the wing 131 and turn it to the neutral position shown in Fig. 14, thereby the electric circuit of the lights 19 and 19a is opened.

It will be noted that when the long arm 69 of the wheel 67 rides on the wings 102 or 131 that the said wings descend against the tension of the springs 97 to smoothly locate the long arm 69 in proper position.

It will be also noted that the number of short arms 68 of the wheel 67 can be varied, depending upon the number of turns to be made by the steering post 20 of the vehicle, before the long arm 69 is positioned to coact with the switches 78 and 79.

It will also be noted that the switches 78 and 79 can be clamped in different positions to vary the distance between said switches, to control the amount of rotation of the steering post 20 before the long arm 69 coacts with the switches.

Various modifications may be made in the invention and the present exemplifications are to be taken as illustrative and not limitative.

Having thus described my invention, I claim:

1. In a device of the character described the combination of the steering post of a vehicle, a stationary steering post housing encircling the steering post, a switch housing connected to the steering post housing, an annular rotatable controlling plate at the upper end of the switch housing, connecting means between said plate and the steering post, a housing fastened to and depending from the controlling plate, a shaft journalled in the latter housing, a switch control wheel fastened to the shaft, a long arm and a plurality of short arms integral with the switch control wheel, electric switches supported in the steering post housing and means coacting with said arms when said steering post is turned to locate said long arm to coact with said switches to open or close the same.

2. In a device of the character described the combination of a steering post for a vehicle, a steering post housing for the steering post, a cylindrical shaped switch housing fastened to the steering post housing, an annular controlling plate rotatably supported at the upper end of the switch housing, means to rotate the controlling plate with the rotations of the steering post of the vehicle, a pair of electric controlling switches supported in the housing each functioning with an electric circuit for the vehicle, a cam supported in the switch housing, a journaled switch control wheel suspended from said annular controlling plate, a long arm and a plurality of short arms integral with said wheel, said cam coacting with said short arms when the steering post of the vehicle is turned to locate said long arm in proper position to coact with said switches to open and close said electric circuits.

3. In a motor vehicle the combination of a steering post, a steering wheel for the post, a steering post housing for the post, a switch housing connected to said steering post housing, a pair of electric switches in the switch housing and connected thereto, said switches controlling a pair of electric circuits, a plate carried in each switch, a wing integral with each plate, a controlling cam in the switch housing and connected thereto, a controlling plate rotatably supported by the switch housing, means connecting the steering wheel and said controlling plate, a switch control wheel journaled and depending from said controlling plate, a plurality of short arms and one long arm for said wheel, said steering wheel when turned engaging said short arms with said cam to position said long arm downwardly and when in said position upon further turning of said steering wheel engaging the wing of one of the switches to energize one of the electric circuits, said steering wheel when initially turned in the opposite direction engaging the long arm with the wing of the other switch to energize the other electric circuit.

4. In a device for a motor vehicle the combination of a steering post, a steering wheel fastened to said post, a steering post housing for said post, a switch housing connected to the steering post housing, a pair of switches in the switch housing and connected thereto, each switch functioning with an electric circuit, a plate in each switch, a pair of wings integral with each plate, a controlling cam in the switch housing and connected thereto, a controlling plate rotatably connected to said switch housing, connecting means between the steering wheel and said controlling plate, a switch control housing connected to the lower face of said controlling plate, a shaft journaled in the latter housing, a switch control wheel fastened to one end of said shaft, a plurality of short arms and one long arm extending from said wheel, a nut at the other end of the shaft and a pair of springs each having one end fastened to said switch control housing and their other ends bearing against said nut, said steering wheel when turned engaging said short arms with said cam to turn said shaft of said switch control housing to position the long arm of said wheel downwardly and upon the further turning of said steering wheel turning the plate of one of said switches and thereby energizing one of said electric circuits on one side of the vehicle and upon reversing the steering wheel opening said electric circuit.

5. In a device for a motor vehicle the combination of a steering post, a steering post housing for the steering post, a switch housing fastened to the steering post housing, said switch housing comprising a pair of longitudinal cylindrical shaped walls, clamps connecting said walls, a bottom wall having an annular opening for each of said longitudinal walls, an annular controlling plate rotatably supported at the upper end of the switch housing, means to rotate the controlling plate with the steering post, a pair of controlling electric switches adjustably supported upon the bottom walls of the switch housing in their openings and each functioning with an electric circuit, a vertical operating shaft for each switch, a plate having a cavity supported on the shaft of each switch, a housing extending from the controlling plate, a shaft journaled in the latter housing, a switch control wheel fastened to the latter shaft, a long arm and a plurality of short arms integral with the switch control wheel, and a cam inclined to a radial line of said steering post in said switch housing, said cam functioning with the short arm of the switch control wheel to position the latter with its long arm to extend downwardly with the rotations of the steering post and said long arm functioning with each switch to open and close the same.

ALEXANDER H. CHAPLEAU.